United States Patent [19]

Baumoel

[11] 4,203,324

[45] May 20, 1980

[54] SONIC LIQUID LEVEL DETECTOR

[76] Inventor: Joseph Baumoel, 107 Columbia Dr., Jericho, Long Island, N.Y. 11753

[21] Appl. No.: 6,183

[22] Filed: Jan. 24, 1979

Related U.S. Application Data

[63] Continuation-in-part of Ser. No. 822,199, Aug. 5, 1977, Pat. No. 4,144,517.

[51] Int. Cl.² ............................................. G01F 23/00
[52] U.S. Cl. ................................... 73/290 V; 367/908
[58] Field of Search ..................... 73/290 V, 599, 600, 73/194 A; 340/1 L

[56] References Cited

U.S. PATENT DOCUMENTS

| | | | |
|---|---|---|---|
| 3,744,301 | 7/1973 | Arave | 73/290 V |
| 4,019,373 | 4/1977 | Freeman | 73/194 A |
| 4,144,517 | 3/1979 | Baumoel | 73/290 V |
| 4,145,914 | 3/1979 | Newman | 340/1 L |

*Primary Examiner*—Donald O. Woodiel

*Attorney, Agent, or Firm*—Ostrolenk, Faber, Gerb & Soffen

[57] ABSTRACT

A method and apparatus for determining a fluid condition adjacent an inner wall boundary of a fluid container is disclosed. A sonic pulse is applied to an outer wall boundary of the container wall and is reflected between an inner and the outer wall boundaries. The magnitude of the sonic pulse decreases each time it is reflected off of the inner wall boundary by an amount which varies as a function of the fluid condition adjacent the inner wall boundary. An electrical reflection pulse whose magnitude is representative of the instantaneous magnitude of the sonic pulse is generated each time the sonic pulse is reflected off of the outer wall boundary of the container. The electrical reflection pulses are integrated during an integration period so as to generate an integration output signal whose value varies as a function of the fluid condition within the container. The integration output signal is compared to a predetermined value to determine the fluid condition.

33 Claims, 30 Drawing Figures

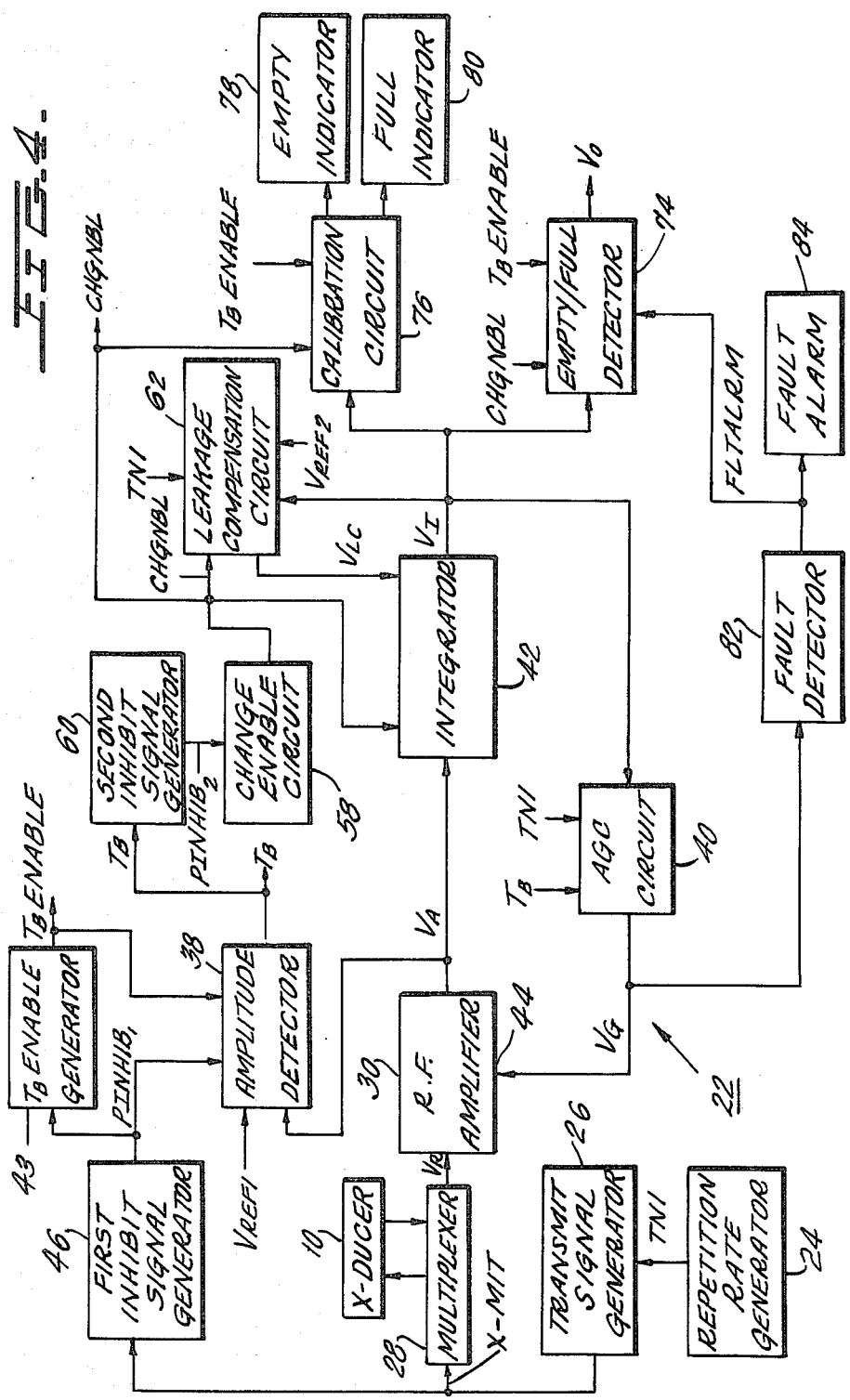

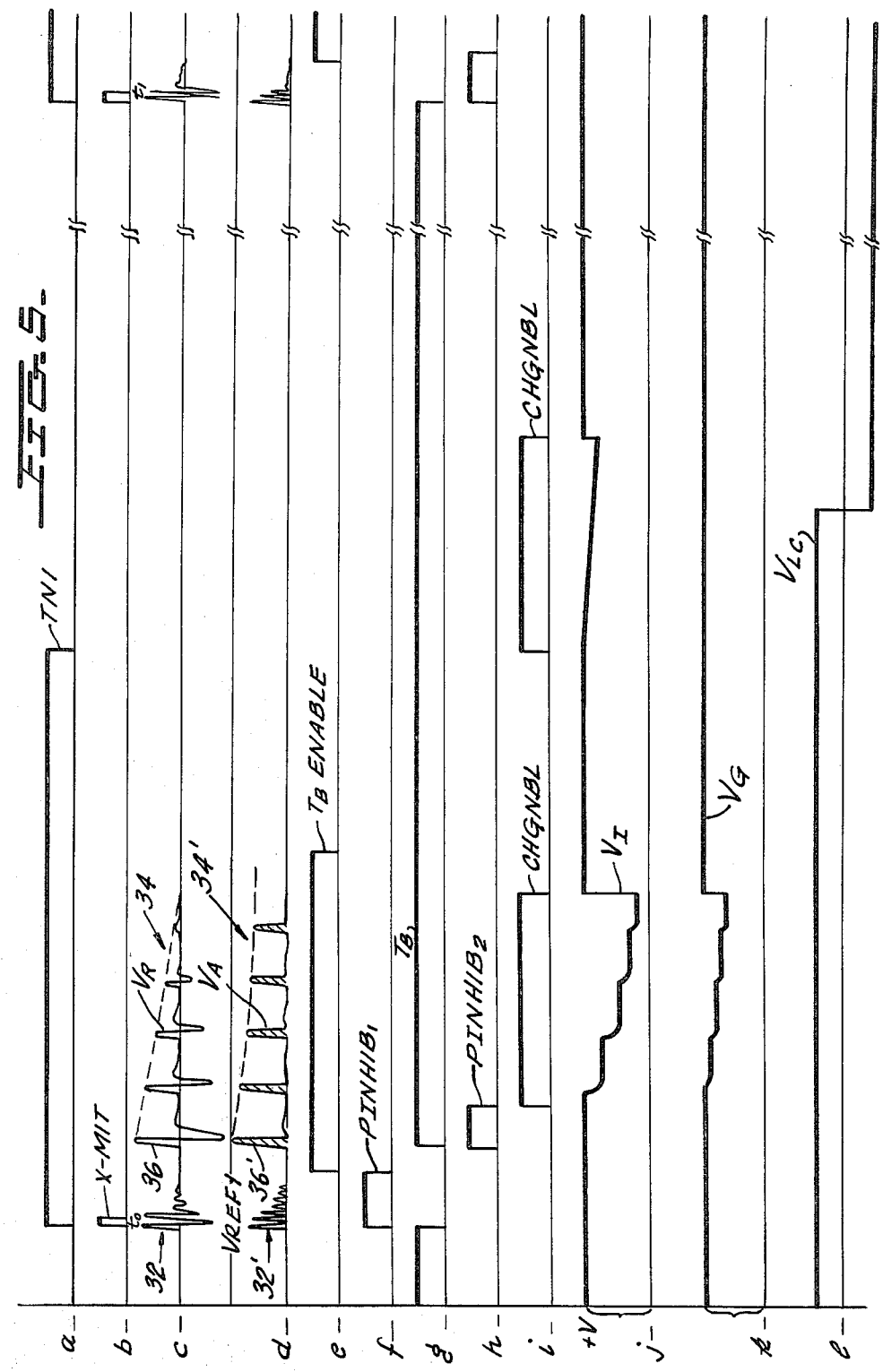

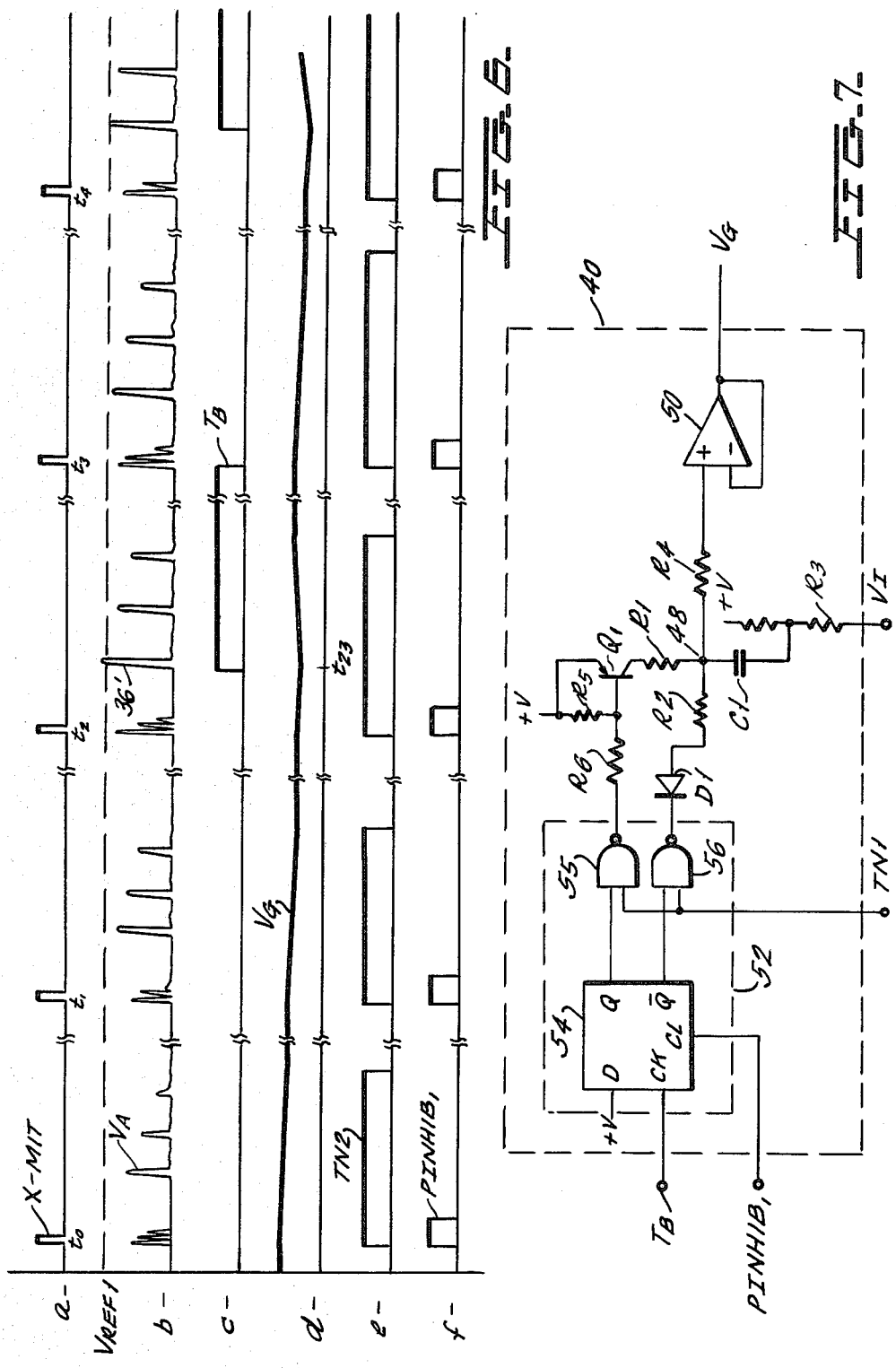

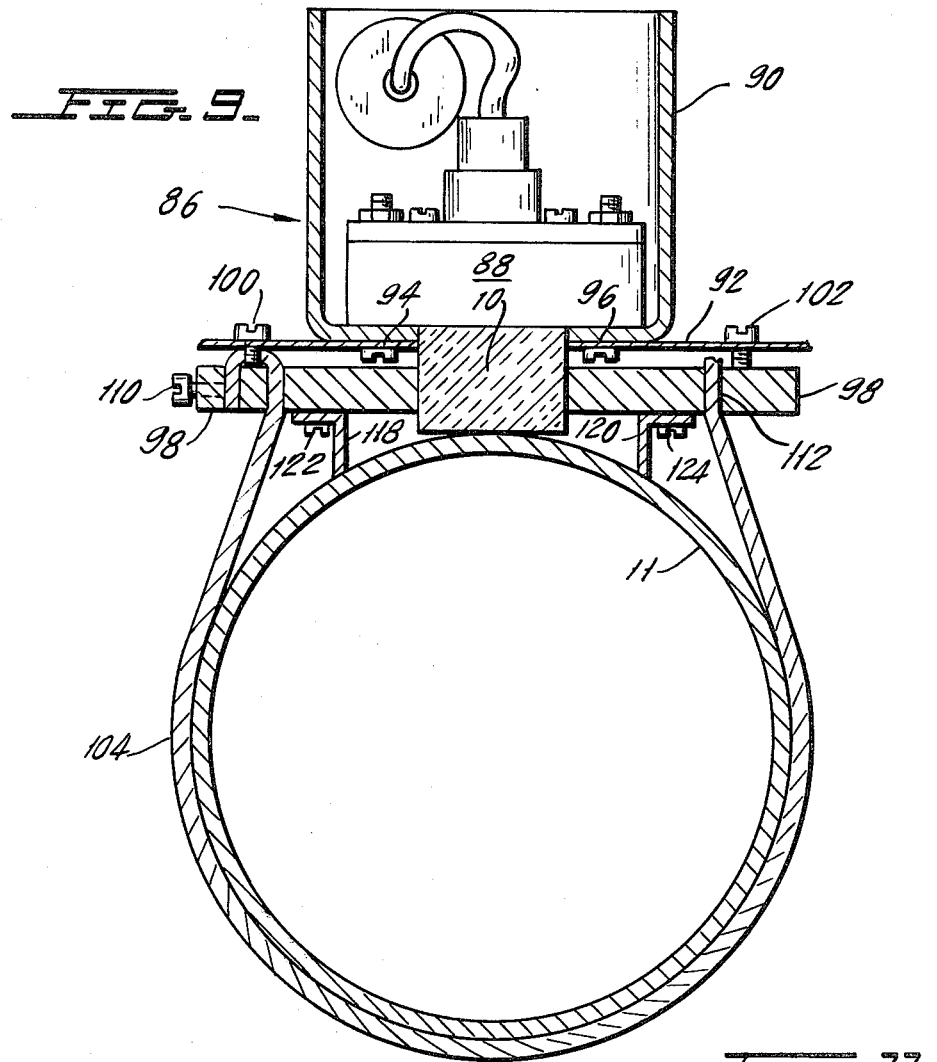
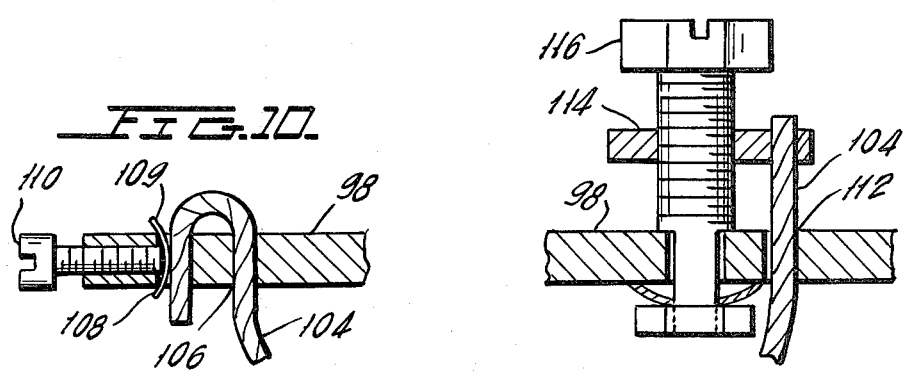

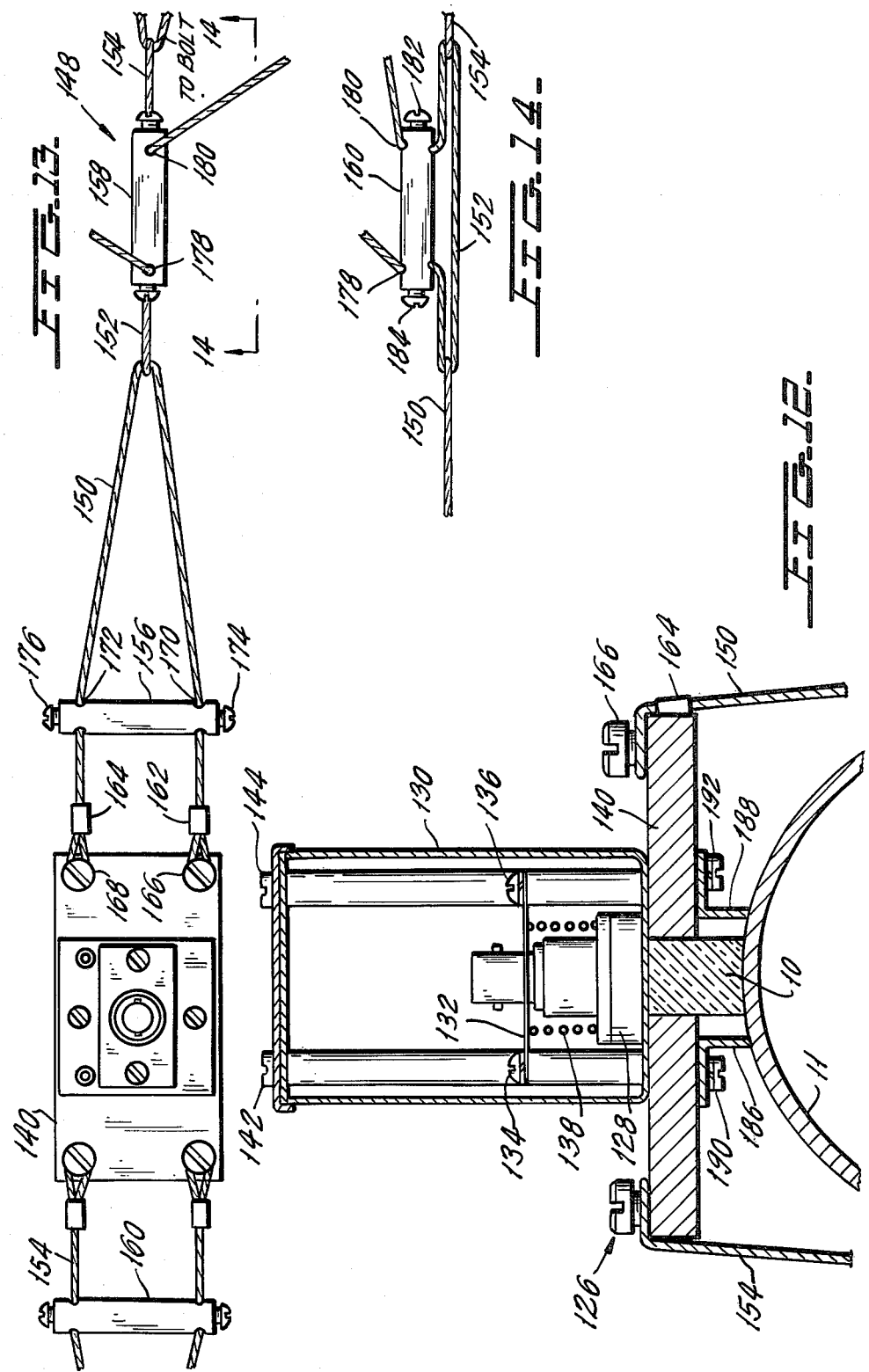

SONIC LIQUID LEVEL DETECTOR

RELATED INVENTIONS

The present application is a continuation-in-part of U.S. patent application Ser. No. 822,199 filed Aug. 5, 1977, now U.S. Pat. No. 4,144,517.

BACKGROUND OF THE INVENTION

The present invention is directed towards an ultrasonic detection circuit which is capable of determining the condition of a fluid within a container without entering the container. More particularly, the present invention relates to an ultrasonic circuit which applies an ultrasonic pulse to the outer wall of the fluid container and determines the condition of the fluid within the container as a function of the decay rate of the sonic pulse as it is reflected between the inner and outer wall boundaries of the container wall. While this circuit is capable of determining many types of fluid conditions (such as the density of the fluid), it is preferably used to determine the presence or absence of liquid within the container.

It is frequently desirable to determine whether a pipe or container is filled with a liquid or to determine the height of the liquid within the container. This is commonly done by gages or other equipment which must penetrate the container wall and reach into the interior of the pipe or the container. These gages are then used to produce an indication of liquid level or the presence of liquid in the container, and can be used to operate liquid flow or liquid level control. The need to gain access to the container interior has the obvious drawbacks of requiring special container designs and, in some cases, special seals to bring out gage components, electrical wires, and the like. Moreover, these parts become subject to failure when exposed to corrosive fluids and hostile environments within a liquid container.

In U.S. patent application Ser. No. 822,199, of which the present invention is a continuation-in-part, a novel ultrasonic measuring circuit which can determine the foregoing conditions without penetrating the container wall is disclosed. In accordance with the foregoing application, the longitudinal ultrasonic energy pulse is applied to the outer boundary of the container wall and undergoes multiple internal reflections within the container wall between the inner and outer boundaries thereof. The amplitude of these reflections decays at a rate dependent upon the sonic impedance of the medium within the container adjacent the inner surface of the container wall in the area of the wall in which the ultrasonic pulse is introduced. If the container is empty at the point where the measurement is made, the rate of decay of the interface reflections is lower than if the pipe is filled with liquid at that point. Thus, by measuring the rate of decay of the amplitude of the multiple reflections, it is possible to determine whether or not there is fluid within the container at the point where the measurement is made. Since the sonic impedance of various liquids differ, a measurement of the rate of decay also may permits the identification of the liquid in the container.

In the foregoing application, the rate of attenuation of the multiple reflections is measured by measuring the exponential decay of the peak value of the reflections. While this approach is suitable for most applications, it has been found unsuitable in thin wall containers and where adequate perpendicularity between the transducer axis and a tangent to the container surface cannot be maintained. In these cases, the peak values of the reflections made depart from a "perfect" exponential with a result that improper determinations may be made by the detector circuitry.

BRIEF DESCRIPTION OF THE INVENTION

To overcome the foregoing problem, the present invention integrates the amplitude of the multiple reflections as a function of time. Such an integration sums the total energy of these reflections and provides a much more precise indication of the condition of the fluid within the container. As used herein, the term "fluid condition" or "condition of the fluid within the container" encompasses both the presence or absence of fluid as well as parameters of the fluid such the density or type of fluid within a container.

In order to determine the relevant fluid condition, the present invention compares the value of the integrator output at the end of the integration period to a predetermined value. In order to obtain accurate results, it is preferable that the integrator output for a first fluid condition (e.g. the presence of fluid) be significantly different than that for a second fluid condition (e.g., the absence of fluid within the container). In order to ensure this desirable result, the integration process of the present invention places more emphasis on the latter reflections (which provide greater information regarding the condition of the fluid within the container) than the earlier reflections. As a result, the difference in the value of the integrator output for full and empty containers will be much greater for the present invention than would be possible if a straight integration technique were utilized.

In accordance with the foregoing, the present invention comprises:

(A) transducer means, including a sonic transducer, for:

(1) applying a sonic pulse to an outer wall boundary of a fluid container after the sonic transducer is placed in contact with the outer wall boundary whereby the sonic pulse enters the wall and is reflected between the outer and inner wall boundary of the container, the magnitude of the sonic pulse decreasing each time it is reflected off of the inner wall boundary by an amount which varies as function of the fluid condition adjacent the inner wall boundary;

(2) generating an electrical reflection pulse whose magnitude is representative of the instantaneous magnitude of the sonic pulse each time the sonic pulse is reflected off of the outer wall boundary whereby the transducer means generates a train of electrical reflection pulses responsive to each sonic pulse applied to the outer wall boundary; and (B) integration means for integrating the train of electrical reflection pulses and for generating an integration output signal whose value varies as a function of the fluid condition; and (C) output means for comparing the integration output signal to a predetermined value to determine the fluid condition.

BRIEF DESCRIPTION OF THE DRAWINGS

For the purpose of illustrating the invention, there are shown in the drawings several embodiments which are presently preferred; it being understood, however, that this invention is not limited to the precise arrangements and instrumentality shown.

FIG. 4 is a block diagram of an ultrasonic detection circuit constructed in accordance with the principles of the present invention.

FIGS. 5a-5l illustrate various input and output signals, on a common time line, of various components of the detection circuit of FIG. 4.

FIGS. 6a-6f illustrate various input and output signals, on a common time line, of various components of the detection circuit of FIG. 4 over several transmission periods.

FIG. 7 is a circuit diagram of the preferred structure of the automatic gain control circuit of FIG. 4.

FIG. 9 is a cross-sectional view of a transducer clamping apparatus for connecting the transducer of the circuit of FIG. 4 to a fluid container.

FIGS. 10 and 11 are detailed views of the clamping structure of FIG. 9.

FIG. 12 is cross-sectional view of a second clamping structure for connecting the transducer of the circuit of FIG. 4 to a fluid container.

FIG. 13 is the top view of the clamping structure of FIG. 12.

FIG. 14 is a detailed side view of a portion of the clamping structure of FIG. 12.

DETAILED DESCRIPTION OF THE DRAWINGS

Figure 1:
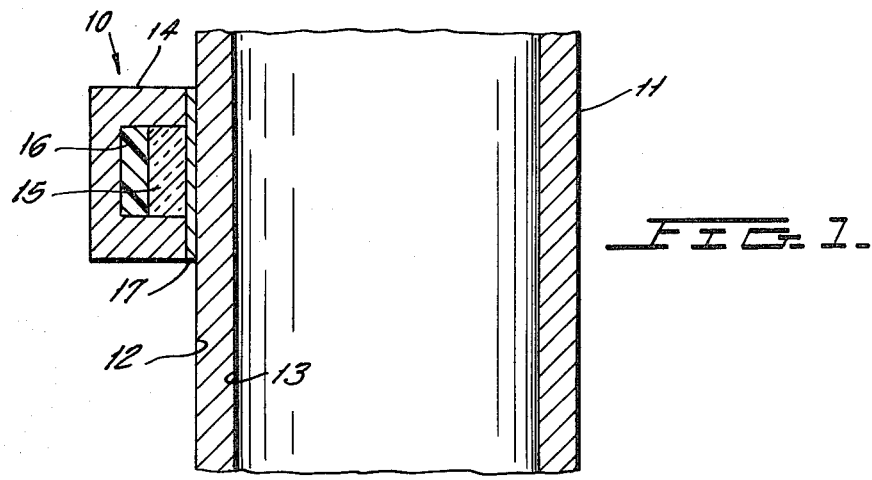
FIG. 1 is a schematic cross-sectional view showing a single transducer pressed against the wall of a fluid container.

Referring now to the drawings wherein the numerals indicate like elements, there is schematically shown in FIG. 1 a transducer 10 fixed to the outer wall of container 11. Container 11 can be any type of fluid container and can be a pipe, a barrel, or the like, which has any fluid stored or flowing therein.

Container 11 is shown as a pipe in FIG. 1 and the pipe may be circular in cross-section, although the container 11 can have any configuration. The wall of container 11 may be of any of a variety of materials which conduct ultrasonic energy, and which exhibit multiple reflections of ultrasonic energy introduced from the outer surface of the pipe and between inner wall surface boundaries 12 and 13 of the container wall. Materials for container 11 may typically be steel, brass and a variety of plastics, and the wall thicknesses may be any desired thickness which typically could range from 1/64 inch to 3 inches.

Transducer 10 may be of any desired design and is used to introduce a longitudinal ultrasonic pulse into the wall of container 11 which pulse is directed perpendicularly to the wall, and which will undergo multiple internal reflections at wall surfaces 12 and 13. Transducer 10 is also operable to produce an output signal which is related to the amplitude of the reflected ultrasonic pulse which it receives from the surface 13.

Transducer 10 may have a steel housing 14 which receives a lead metaniobate crystal 15 which is backed by a sound-absorbent layer 16 which may be of tungsten loaded epoxy. Leads, not shown, are connected to crystal 15 and a suitable voltage connected to these leads causes crystal 15 to produce a sharp sonic wave into the wall of container 11, and permit the production of an output voltage in response to the reflected ultrasonic waves. The use of lead metaniobate is preferred since it limits ringing and produces a sharp output pulse at a frequency, for example, of 5 megahertz.

Transducer 10 can be secured to container 11 in any desired manner. Thus, it may be secured by cementing with an expoxy cement which insures good sonic connection between the container 11 and transducer 10, or it can be clamped to the container 11 by any suitable clamping structure (not shown). One suitable clamping structure is that shown in U.S. Pat. No. 3,987,674, in the name of Baumoel, entitled "TRANSDUCER STRUCTURE AND SUPPORT FOR FLUID MEASURING DEVICE." Other suitable clamping structures are described below.

When clamping is used, a coupling medium layer 17 such as glycerine or silicone oil or the like should be used between the transducer 10 and container 11. When small diameter pipes are used, a flat should be placed on the pipe where it receives transducer 10 to insure coupling between the pipe and transducer. Note that the transducer 10 may also be shaped to conform to the container wall surface.

Transducer 10 may also be a fully portable element, and can be simply pressed against any part of the surface of container 11 to determine whether there is liquid at the level of the transducer 10.

One or several permanent or semi-permanent transducers may be mounted at different locations or heights of a container, and can be connected for any desired control scheme.

When transducer 10 is pulsed, it produces a sharp, longitudinal ultrasonic wave which propagates into the wall of container 11 and toward surface 13. The amplitude of the first return signal reflected from surface 13 is a function of the voltage applied to the transducer, the degree of coupling of the transducer to container 11, the sonic impedance of wall of container 11, and the sonic impedance of the medium within container 11 at the transducer location. The medium will be a liquid if the container is filled at the transducer location or air, for example, if the container is empty at the transducer location.

The reflected pulse reaches interface 12 in a time $T=2w/V_s$, where w is the wall thickness and $V_s$ is the velocity of sound in the container wall, and the pulse return is sensed by transducer 10 and is re-reflected toward interface 13. The magnitude of the pulse next reflected by interface 13 will be attenuated, relative to the first reflection therefrom, by an amount which is a function of the sonic impedances of the container wall and of the medium within the container, and by the attenuation in the container wall itself. Thus, the amplitude of each subsequent return signal will decay at the rate dependent on the sonic impedance in the medium within container 11 which is relatively high if the medium is liquid and relatively low if the medium is a gas. Consequently, the multiple interal reflections in the container wall will be rapidly attenuated if the container contains a liquid at the measurement location, and will be less rapidly attenuated if the container is empty at the measurement location. Moreover, the attenuation will be different for different liquids, thus allowing the device to discriminate between different liquids.

Figure 2A:
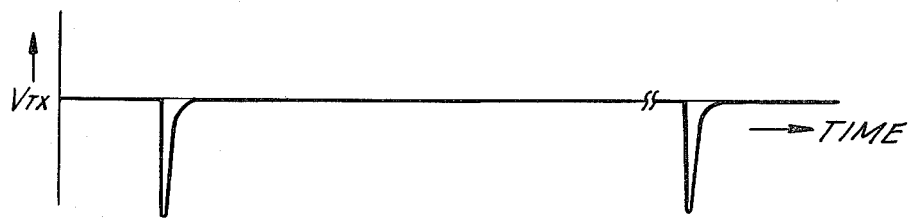
FIGS. 2a-2d are plotted on a common time scale and respectively illustrate the ultrasonic pulse amplitude, the ideal return signal for a liquid-filled container, the ideal return signal for an empty container and a non-ideal return signal for an empty container.
Figure 2B:
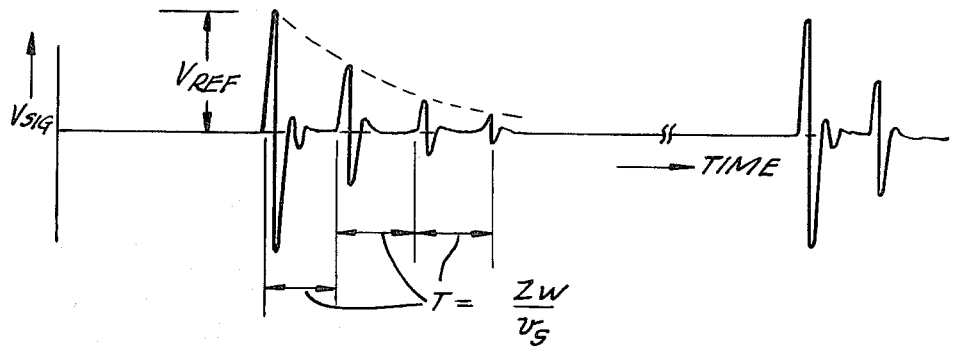
Figure 2C:
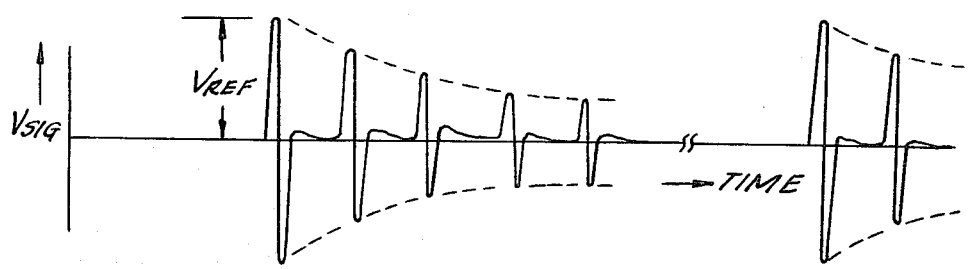

The attenuation of the return signal is illustrated in FIGS. 2a, 2b and 2c which show, on a common time base, the transducer transmit pulse (FIG. 2a), and the multiple reflected signal from surface 13 for the situations where the container is full and empty, respectively, at the measurement location (FIGS. 2b and 2c, respectively). As shown in FIGS. 2b and 2c, the rate of attenuation of the multiple reflections in a full container (at the measurement location) is much greater than for an empty container.

Figure 2D:
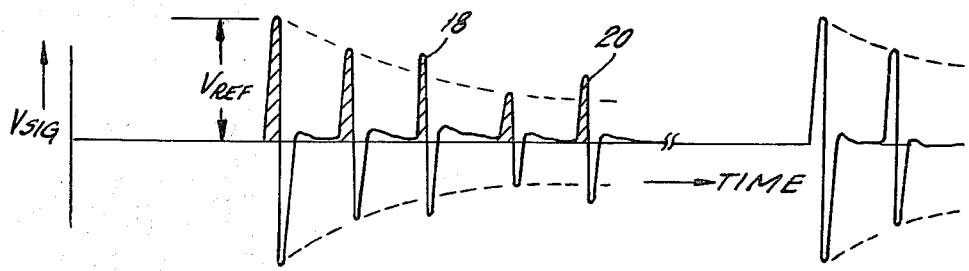

In U.S. patent application Ser. No. 822,199, the rate of attenuation of the multiple reflections received by transducer 10 was measured by measuring the exponential decay of the peak values of the reflections. While this approach is suitable for most applications, it has been found unsuitable in thin wall pipes (or vessels) or where adequate perpendicularity between the transducer axis and tangent to the container surface cannot be maintained. In such cases, the decay curve may not be a "perfect" exponential as illustrated in FIGS. 2b and 2c. While the actual curve may be generally exponential it may depart from the ideal exponential for short time intervals as shown at 18 and 20 in FIG. 2d. As a result, inaccurate results may be obtained if the exponential decay curve is directly measured.

To overcome the foregoing drawback, the present invention integrates the amplitude of the return echoes as a function of time. Such an integration sums the total energy as represented by the shaded areas in FIG. 2d and is therefore independent of the precise shape of the decay curve.

Figure 3:
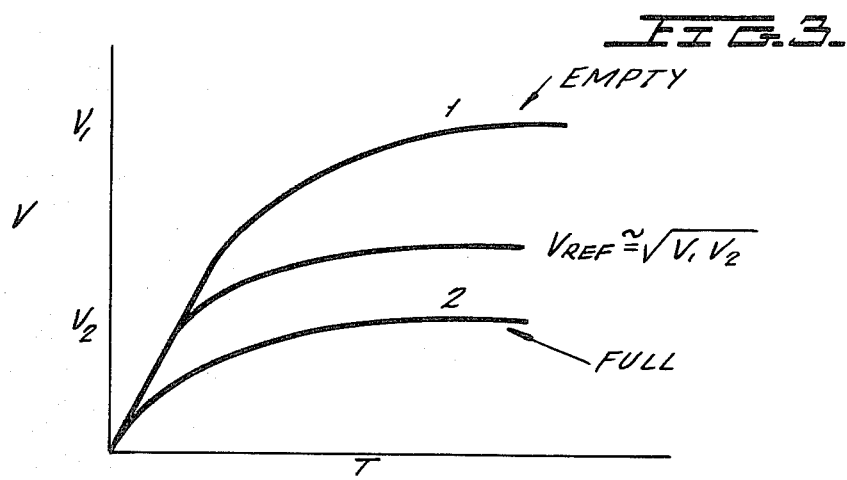
FIG. 3 is a graph illustrating the integration output of the present invention for a full and empty container.

Referring to FIG. 3, the resultant integration of the return echoes as a function of time will be either a curve "1" for an empty vessel or curve "2" for a full vessel. By setting a reference level at the geometric mean voltage between these two levels and comparing the result of the integration to the reference level, it is possible to distinguish between a full and an empty condition.

As noted in the foregoing application, the magnitude (in contrast to the rate of decay) of the reflected signal varies as a function of the transducer coupling and the sonic characteristics of the container wall. In contrast, the rate of decay of the signal is independent of these parameters and is determined by the presence of absence of fluid in the pipe 11. Accordingly, it is necessary to standardize the magnitude of the initial reflection so as to ensure that the integration process provides an indication of the decay rate independent of such factors as the transducer coupling.

Since the magnitude of the first reflection is standardized to a predetermined value, it does not provide relevant information regarding the rate of decay of the reflections. Accordingly, it is undesirable to integrate this reflection. For this reason, an inhibit pulse is provided which prevents the integrator from integrating the first reflection.

While a straight integration of the remaining reflections will provide pertinent information regarding the rate of decay thereof, the present invention processes the integration information in a manner which will enhance the quality of the decay rate information provided by the integrator. Reflections which occur later in time (higher order reflection multiples from the container walls) undergo larger percentage changes in amplitudes due to the presence or absence of liquid in the pipe. As a result, the higher order reflections are richer in decay rate information and therefore in information relevant to the presence or absence of liquid in the container being monitored. It is desirable, therefore, for the later reflections to contribute a larger share of the integrator's output. Unfortunately, the latter echoes are lower in amplitude than the earlier ones which change much less dramatically. To overcome this short coming, a primary feature of the present invention is the presence of compensation circuitry which emphasizes the intergration of the higher order reflections and, relatively speaking, de-emphasizes the contribution of the lower order reflections. This result is preferably obtained by using an integration dependent varying automatic gain control circuit which increases the amplification of the higher order pulses by an amount which varies as a function of the instantaneous output of the integrator. As a result, the output of the integrator at the end of the integration process is higher for an empty container and lower for a full container than the equivalent output would be if a straight integration process was used. This is a highly desirable result since it enhances the difference between the integrator output for full and empty pipe conditions and thereby provides for a more accurate determination of the presence or absence of liquid in the container 11.

Referring now to FIG. 4, there is illustrated a fluid detection circuit constructed in accordance with the principals of the present invention and designated generally as 22. Fluid detection circuit 22 includes a repetition rate generator 24 which generates a timing signal TN1 which is applied to various components of circuit 22 and controls the timing thereof. The waveform of signal TN1 is illustrated in FIG. 5a. The signal TN1 is supplied to transmit signal generator 26 which generates a transmit pulse X-MIT responsive to the leading edge of pulse TN1. Transmit pulse X-MIT is applied to transducer 10 via multiplexer 28, causing transducer 10 to introduce a longitudinal ultrasonic pulse into the wall of container 11. The resultant vibration of the pipe wall is detected by transducer 10 which generates a voltage signal $V_R$ indicative of these vibrations. This signal, hereinafter referred to as the reflection signal, is applied to an RF amplifier 30 via multiplexer 28.

As shown in FIG. 5c, the reflection signal $V_R$ includes a first component 32 indicative of the vibrations induced in the transducer 10 by the initial transmit pulse and a second component 34 which is indicative of the multiple reflections of the sonic signal generated by transducer 10. These reflections are primarily contained within the wall surface boundaries 12 and 13 of the container wall but may also include components which are reflected from the far wall of the container "and through the liquid in the container."

As shown in FIG. 5d, the peak values of the successive reflections of component 34 of reflection signal $V_R$ define a generally exponential decay curve which, as noted above, provides information regarding the presence or absence of fluid in the container 11. For the reasons noted above, it is desirable to process this signal in such a manner that the first reflection 36 of the component 34 is standardized to a predetermined magnitude and such that the relative magnitude of the higher order reflections vary as a function of the instantaneous output of the integrator. These functions are provided by the $R_F$ amplifier 30 in cooperation with the amplitude detector 38, the automatic gain control (hereinafter AGC) circuit 40 and the integrator 42. Before describing the manner in which these elements achieve the foregoing results, the term "transmission period" should be defined. As used herein, the term transmission period refers to the time interval between each successive transmit pulse X-MIT. With particular reference to FIG. 5b, the first transmission period begins at time $t_o$ and ends at time $t_1$. During this transmission period, transducer 10 induces a single sonic beam in the wall of container 11 and there is an initial "ringing" of the transducer at time $t_o$. This ringing defines component 32 of reflection signal $V_R$. The signal induced by transducer 10 then propagates to the interface 13 of the container wall and is reflected back and forth between interfaces 12, 13. These reflection signals define the component 34 of the reflection signal $V_R$. See FIG. 5c.

Returning again to FIG. 4, amplifier 30 amplifies the reflection signal $V_R$ by an amplification factor determined by the magnitude of the gain signal $V_G$ applied to its gain control input 44. In the particular embodiment described herein, it is assumed that the gain of amplifier 30 increases as the magnitude of the gain signal $V_G$ decreases. Of course, an amplifier whose gain increases for an increasing gain signal $V_G$ could also be used with appropriate modifications to the circuits described below. In any case, the amplitude detector 38, AGC circuit 40 and integrator 42 cooperate to ensure that the magnitude of the gain signal $V_G$ varies in such a manner that the magnitude of the first reflection 36' of the amplitude reflection signal $V_A$ (see FIG. 5d) is standardized to a predetermined value and that the amplification of the higher order reflections of the component 34' of the amplified reflection signal $V_A$ varies as a function of the instantaneous output of integrator 42.

In order to ensure that the magnitude of the first reflection 36' of the amplified reflection signal $V_A$ is standardized at a predetermined value, amplitude detector 38 generates an output signal $T_B$ (see FIG. 5g), which informs AGC circuit 40 whether to increase or decrease the gain of amplifier 30 to ensure that the magnitude of the first reflection 36' is maintained at approximately the reference value. To this end, amplitude detector 38 compares the amplitude of the amplified reflection signal $V_A$ with a reference signal $V_{REF1}$ during each respective transmission period and generates an output signal $T_B$ during any transmission period in which the magnitude of the voltage $V_A$ rises above the reference voltage $V_{REF1}$. In those transmission periods wherein the voltage $V_A$ remains below the reference voltage $V_{REF1}$, amplitude detector 38 does not generate the output signal $T_B$.

It is important that amplitude detector 38 does not compare that portion of the amplified reflection voltage $V_A$ which is created by the initial ringing of the transducer 10 (i.e. component 32') to the reference voltage $V_{REF1}$ since the initial ringing may include spikes of large magnitude which can accidentally cause the generation of the signal $T_B$. For this reason, a $T_B$ ENABLE Generator 43 generates a $T_B$ ENABLE signal (see FIG. 5e) whose duration is timed to encompass component 34' of amplified reflector signal $V_A$ but which is not generated until after component 36' of signal $V_A$ has attenuated to substantially zero. To ensure appropriate timing, an inhibit signal PINHIB$_1$ (see FIG. 5f) is generated by a first inhibit signal generator 46 responsive to the transmit pulse X-MIT. The duration of inhibit signal PINHIB$_1$ is sufficiently long to insure that the initiating ringing (component 32') of the transducer 10 has attenuated to substantially zero but sufficiently short that it ceases prior to the receipt of the first reflection 36'. By generating $T_B$ ENABLE responsive to the trailing edge of the inhibit signal PINHIB$_1$, and for a proper predetermined duration (longer than the expected length of the detectable portion of component 34'), it is possible to ensure that amplitude detector 38 generates the signal $T_B$ at its output only when one of the pulses of component 34' of the amplified reflection voltage $V_A$ increases above the reference voltage $V_{REF1}$.

The signal $T_B$ is applied to AGC circuit 40 and adjusts the magnitude of the gain signal $V_G$ in such a manner that the gain of amplifier 30 increases during those transmission periods in which the signal $T_B$ is not generated and decreases during those transmission periods in which the $T_B$ signal is generated. The net effect of this limitation is that AGC circuit 40 maintains the magnitude of the first pulse 36' of component 34' of the amplified signal $V_A$ at substantially the reference voltage $V_{REF1}$.

The preferred structure of AGC circuit 40 is illustrated in FIG. 7. The heart of AGC circuit 40 is an integrating capacitor C1 which is charged through resistor R1 and discharged through resistor R2 as a function of the presence or absence of the signal $T_B$. Capacitor C1 is also charged and discharged through resistor R3 as a function of the integrator output $V_I$. The manner in which the integrator output $V_I$ effects the operation of AGC circuit 40 will be described below. For the present time it will be assumed that the magnitude of the signal $V_I$ remains at a constant value. In such a condition, the charge across capacitor C1, and therefore the voltage at summing junction 48, is controlled solely by the charge supplied to and withdrawn from capacitor C1 via through resistors R1 and R2, respectively. The voltage at summing junction 48 is applied to the non-inverting input terminal of operational amplifier 50 via resistor R4 and defines the magnitude of the gain signal $V_G$. Capacitor C1 is charged through resistor R1 whenever transistor Q1 is turned on and is discharged through resistor R2 whenever diode D1 is forward bias. The operation of transistor Q1 and diode D1 is determined by logic circuit 52 which includes a clocked flip-flop 54 and a pair of NAND gates 55, 56. During those periods of time during which the timing signal TN1 is not generated, the output of NAND gates 55, 56 are both "high," reverse biasing both the base-emitter junction of transistor Q1 and diode D1. In this condition, the charge across capacitor C1 remains constant and the magnitude of the gain signal $V_G$ also remains constant.

During the time interval defined by timing signal TN1, NAND gates 55, 56 are enabled and the condition of their respective outputs is determined by the condition of the Q and $\overline{Q}$ outputs of flip-flop 54, respectively. The operation of AGC circuit 40 during this time interval may best be understood with reference to FIG. 6. At time $t_0$, the inhibit signal PINHIB$_1$ is applied to the clear CL input of flip-flop 54 causing the Q and $\overline{Q}$ outputs of flip-flop 54 to go "low" and "high," respectively. The "low" applied to the input of NAND gate 55 causes the output of NAND gate 55 to go "high," reverse biasing the base-emitter junction of transistor Q1 and turning transistor Q1 off. The "high" applied to the input of NAND gate 56 causes the output of NAND gate 56 to go "low," forward biasing diode D1. In this condition, capacitor C1 is permitted to discharge through resistor R2. Since no $T_B$ signal is generated during the first transmission period ($t_0$–$t_1$), the $\overline{Q}$ output of flip-flop 48 remains "low" and capacitor C1 is permitted to continue discharging until the timing signal TN1 is no longer generated. Accordingly, the voltage at summing junction 48 continually decreases, thereby decreasing magnitude of the gain signal $V_G$. This process is repeated in each successive transmission period until the magnitude of the reflection 36' rises above the reference voltage $V_{REF1}$. In the example illustrated in FIG. 6, this occurs during the third transmission period $t_2$-$t_3$. In a practical application, this event may not occur for a large number of transmission periods totaling several seconds of elapsed time. This period represents the start up period of the detector 22.

At the beginning of the transmission period $t_2$-$t_3$, the generation of the inhibit signal PINHIB$_1$ causes the Q and $\overline{Q}$ outputs flip-flop 54 to go "low" and "high," respectively, causing capacitor C1 to discharge through resistor 2. At time $t_{23}$ (see FIG. 6d), the signal $T_B$ is generated and applied to the clock input CK of flip-flop 54 causing the Q and $\overline{Q}$ outputs of flip-flop 54 to go "high" and "low," respectively. The "low" applied to NAND gate 56 causes its output to go "high" thereby back biasing diode D1. The "high" applied to NAND gate 54 causes its output to go "low" thereby permitting current to flow through resistors R5 and R6 and forward biasing the base-emitter junction of transistor Q1. In this condition, transistor Q1 is "on" and capacitor C1 begins charging through resistor R1. The charge across capacitor C1, and therefore the voltage at summing junction 48, continues to increase until the end of the time period defined by timing signal TN1. This process is repeated in each successive transmission period until the magnitude of the reflection 36' falls below the reference value $V_{REF1}$ at which time the operation of AGC circuit 40 will revert to that illustrated for transmission periods $t_0$-$t_1$ and $t_1$-$t_2$.

In summary, there will be a net increase in the gain of amplifier 30 during each transmission period during which $T_B$ is not generated and a net decrease in the gain of amplifier 30 during each tranmission period in which the signal $T_B$ is generated. The time constant of capacitor C1 and resistors R1, R2 are chosen such that the average DC voltage appearing at summing junction 48 (and therefore at the output of amplifier 50) appears stable and is representative of the final operating point of the R.F. amplifier 30.

In the foregoing discussion, it has been assumed that the magnitude of the integrator output $V_I$ is constant. In fact, its magnitude decreases during the charge enable period defined by a charge enable signal CHGNBL (see FIG. 5i) generated by charge enable circuit 58. More particularly, the magnitude of the integrator output $V_I$ decreases each time a new reflection pulse of component 34' of the amplified reflection signal $V_A$ is integrated by integrator 42. As such, the magnitude of the integrator output $V_I$ takes the form illustrated in FIG. 5j. This signal is applied to resistor R3 of AGC circuit 40 (see FIG. 7) causing the voltage at summing junction 48 to decrease correspondingly during the integration period. Accordingly, the gain of amplifier 30 is greater for a higher order reflections than for lower order reflections. See FIG. 5k. Additionally, since the decrease in the magnitude of the integrator output varies as an inverse function of the reflected signals (component 34'), the gain of the higher order reflections will be relatively greater for an empty container (which will exhibit lower attenuation) than for a full container. In this manner, the AGC circuit 40 defines a feedback loop between integrator 42 and amplifier 30 which has the effect of amplifying the difference in the magnitude of the integrator output $V_I$ at the end of the integration period for empty and full containers. This emphasis is highly desirable since it enables a more accurate determination of the presence or absence or fluid in the container.

As noted above, it is undesirable for integrator 42 to integrate the first echo 36' of the amplifier reflection signal $V_A$ since the magnitude of this reflection has been standarized by AGC circuit 40. In order to ensure that this echo will not be integrated, detector circuit 22 includes a second inhibit signal generator 60 which generates a second inhibit signal PINHIB$_2$ (see FIG. 5h) responsive to the generation of the signal $T_B$. The duration of the inhibit signal PINHIB$_2$ is sufficiently long to preclude the integration of the first reflection signal 36' but sufficiently short to permit the integration of the remaining reflection signals. It should be recognized at this time, that the reflection signal 36' need not necessarily be the first reflection signal received by transducer 10 but, rather, is the first reflection signal received by transducer 10 in any given transmission period whose magnitude reaches the reference magnitude $V_{REF1}$.

The inhibit signal PINHIB$_2$ generated by second inhibit signal generator 60 is applied to charge enable circuit 58 which generates a charge enable signal CHGNBL responsive thereto. The duration of the charge enable CHGNBL is determined by an RC timing circuit in charge enable circuit 58 and is designed to be sufficiently long to permit integration of substantially all of the detectable reflection signals (with the exception of signal 36') defining component 34'. For reasons which will be shown below, a second charge enable signal CHGNBL is generated during each transmission period (see FIG. 5i). This second charge enable signal CHGNBL is generated responsive to the trailing edge of the timing signal TN1 and has the same time duration as the first charge enable signal CHGNBL. The charge enable signals CHGNBL are applied to both integrator 42 and leakage compensation circuit 62. Each of the charge enable signals define an integration period for integrator 42. The second charge enable signal defines a leakage compensation interval during which leakage compensation circuit 62 adjusts the operation of integrator 42 to compensate for leakage currents therein.

Figure 8:
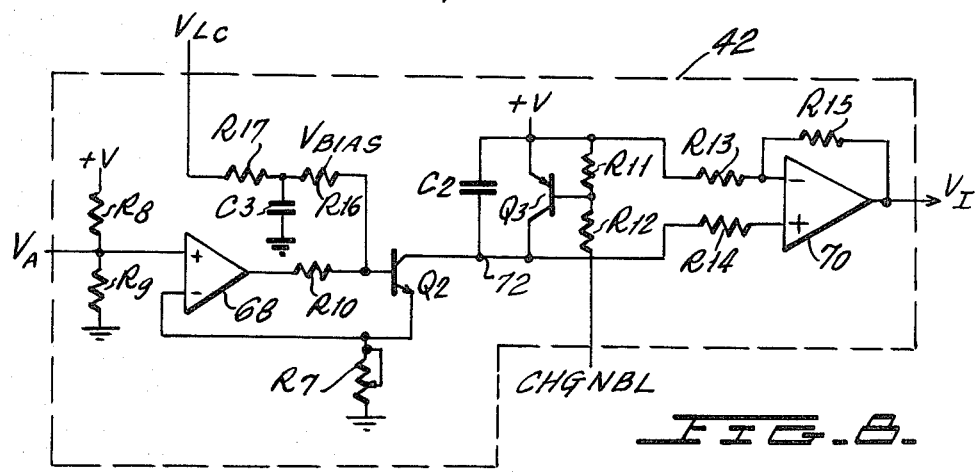
FIG. 8 is a circuit diagram of the preferred structure of the integrator of the circuit of FIG. 4.

The preferred structure of integrator 42 is illustrated in FIG. 8. The heart of integrator 42 is an integrating capacitor C2 which is discharged through potentiometer R7 via transistor Q2 during each of the charge enable periods defined by the charge enable signal CHGNBL. The amount by which capacitor C2 is discharged during each of the charge enable periods is determined by the wave form of the amplified reflection signal $V_A$ applied to the non-inverting input terminal of non-inverting amplifier 68 and by the biasing voltage $V_{BIAS}$ appearing across capacitor C3. As will be explained in greater detail below, leakage compensation circuit 62 maintains the charge across capacitor C3, at such a value that the base-emitter circuit of transistor Q3 is held at its threshold of sensitivity. At this time, it will be assumed that the voltage across capacitor C3 is at a constant value. In this condition, the amplified reflection voltage $V_A$ (as stepped up by voltage divider R8, R9) is applied to the base of transistor Q2 via resistor R10 by amplifier 68. The magnitude of the amplified reflection signal $V_A$ thereby determines the degree of conduction of transistor Q2 which is biased to operate in an amplifier mode.

During those time periods in which the charge enable signal is not generated (i.e., the charge enable signal is at zero volts DC), current is permitted to flow from the biasing voltage +V through resistors R11, R12 to ground. The voltage drop across resistor R11 forward biases the emitter base junction of transistor Q3, turning transistor Q3 on. In this condition, transistor Q3 short-circuits integrating capacitor C2 and presents +V volts to the inverting and non-inverting input terminals of difference amplifier 70 via resistors R13, R14, respectively. Since amplifier 70 attempts to maintain the voltage on its inverting and non-inverting input terminals at the same voltage, the output voltage $V_I$ will be maintained at +V volts via feedback resistor R15. Accordingly, the output of integrator 42 remains +V volts during the non-integration period defined by the charge enable signals CHGNBL. See FIG. 5j.

During the first charging period defined by the first charge enable signal CHGNBL, the emitter base junction of transistor Q3 is reverse biased permitting capacitor C2 to discharge through transistor Q2 and potentiometer R7. Due to the wave form of the amplified reflection signal $V_A$, transistor Q2 will intermittently be turned on by an amount determined by the magnitude of each consecutive reflection signal. This causes the voltage at node 72 to decrease in steps causing a concurrent decrease in the output of amplifier 70 so as to result in the wave form illustrated in FIG. 5j.

As noted above, transistor Q2 is operated as an amplifying transistor. As such, the amount of current discharged through capacitor C2 during the integration period defined by charge enable signal CHGNBL varies as a function of both the magnitude of the voltage applied to the base of transistor Q2 and of the operating point of transistor Q2. Since the operating point of transistor Q2 varies with temperature, the amount of discharge of capacitor C2 during the integration period may also vary as a function of temperature. This is a highly undesirable result since it causes the magnitude of the integrator output $V_I$ to vary as a function of temperature. As will be described below, the integrator output $V_I$ is compared by empty/full detector 74 to a predetermined value to determine if the container 11 is empty or full. If the magnitude of integrator output $V_I$ is permitted to vary with temperature, it is possible for empty/full detector 74 to provide an inaccurate determination of the condition of container 11. To avoid this problem, the present invention includes a leakage compensation circuit 62 which varies the magnitude of the bias voltage $V_{BIAS}$ appearing across capacitor C3 to compensate for temperature variations and to maintain the operating point of transistor Q2 at its threshold of sensitivity. Particularly, leakage compensation circuit 62 increases the bias voltage $V_{BIAS}$, so as to cause transistor Q2 to draw more current and thereby charge more, whenever the operating point of transistor Q2 is below the threshold of sensivity and decreases the biasing voltage $V_{BIAS}$, so as to cause transistor Q2 to draw less current and thereby charge less, whenever the operating point of transistor Q2 is above the threshold of sensitivity.

In order to obtain the foregoing result, leakage compensation circuit 62 compares the integrator output $V_I$ to a second reference voltage $V_{REF2}$ during the second integration period defined by the second charge enable signal CHGNBL. In order to distinguish between the first and second charge enable signals, leakage compensation circuit 62 makes the foregoing comparison between the integrator output $V_I$ and the reference voltage $V_{REF2}$ only when it receives the charge enable signal CHGNBL and does not receive the timing signal TN1.

During the generation of the second charge enable signal CHGNBL, transistor Q3 is turned off thereby permitting capacitor C2 to discharge through potentiometer R7. Since the magnitude of the amplified reflection signal $V_A$ is substantially zero during this time interval, capacitor C2 will discharge at a slow rate determined by the leakage current of transistor Q2. When the base-emitter circuit of transistor Q2 is properly biased to maintain transistor Q at the proper operating point, capacitor C2 will discharge by a predetermined amount resulting in a corresponding decrease in the magnitude of the integrator output $V_I$. See FIG. 5j. Whenever the operating point of transistor Q2 is above the desired value, capacitor C2 will discharge by a greater amount and the magnitude of the integrator output $V_I$ will decrease by a greater amount. Conversely, when the operating point of transistor Q2 is below the desired value, capacitor C2 will discharge by a lesser amount with the result that the magnitude of the integrator output $V_I$ will also decrease by a lesser amount. As long as the magnitude of the integrator output $V_I$ remains above the predetermined value $V_{REF2}$ during the second integration period defined by the second charge enable signal CHGNBL, the operating point of transistor Q2 is below the desired value and leakage compensation circuit 62 generates a positive leakage compensation signal $V_{LC}$ which is applied to capacitor C3 via resistor R17. This voltage slowly charges capacitor C3 at a rate determined by the time constant of resistor R17 and capacitor C3. When the operating point of transistor Q2 finally rises above the desired value during the second integration period defined by the second charge enable signal CHGNBL, the integrator output $V_I$ falls below the predetermined value $V_{REF2}$ and leakage compensation circuit 62 generates a negative leakage current signal $V_{LC}$ which causes capacitor C3 to discharge through resistor R17. See FIG. 5l. The net effect of the foregoing operation is to adjust the magnitude of the bias voltage $V_{BIAS}$ during each transmission period in a direction which will cause the operating point of transistor Q2 to be maintained at the desired operating point. It is preferred that the switching action of leakage compensation circuit 62 take place at about a 1 KHZ rate in order that the average DC voltage appearing across capacitor C3 varies very slowly and appears to be a steady DC voltage.

Referring again to FIG. 4, integrator output $V_I$ is applied to both empty/full detector 74 and to the calibration circuit 76. Empty/full detector 74 compares the magnitude of the integrator output $V_I$ to a reference level located at the geometric mean between the magnitude of the integrator output $V_I$ at the end of the integration period for full and empty conditions, respectively. See FIG. 3 and the description thereof. This reference level $V_{REF3}$ is determined by calibration circuit 76.

Calibration circuit 76 includes first and second comparators (not shown) for comparing the magnitude of the integrator output $V_I$ to fourth and fifth reference voltages $V_{REF4}$, $V_{REF5}$, respectively. To ensure that the comparators of calibration circuit 76 compare the integrator output $V_A$ to the reference voltages $V_{REF4}$, $V_{REF5}$ only during the integration period defined by the first charge enable signal CHGNBL, calibration circuit 76 performs the foregoing comparisons only when it receives both the charge enable and $T_B$ENABLE signals.

The fourth reference voltage $V_{REF4}$ is preferably a present voltage and corresponds to the magnitude of the integrator voltage $V_I$ at the end of an integration period for an empty container. When the magnitude of the integrator output $V_I$ falls below this value, the first comparator generates an output signal which is applied to empty indicator 78. Empty indicator 78 is preferably a light, but may be a buzzer or other appropriate indicator device.

In order to properly calibrate detector circuit 22, the transducer 10 is placed on a portion of the container adjacent an area whose liquid condition (e.g. empty or full) is known. Repetition rate generator 24 is then energized to institute a series of transmission periods. Assuming the container is empty, the position of the slide arm of potentiometer R7 of integrator 42 (see FIG. 8) is then adjusted to vary the time constant of the RC circuit defined by potentiometer R7 and capacitor C2. As a result, the magnitude of the integrator output $V_I$ is also varied. The position of the slide arm of potentiometer R7 is adjusted such that empty indicator 78 just illuminates at the end of the integration period. In this manner, calibration circuit 76, in cooperation with potentiometer R7, adjusts the magnitude of the integrator output $V_I$ at the end of the first integration period to a predetermined value equal to the reference voltage $V_{REF4}$ when a sonic beam is induced into the container wall of an empty container 11.

The second comparator in calibration circuit 76 compares the magnitude of the integrator output $V_I$ with the fifth reference voltage $V_{REF5}$ which may be adjusted within the calibration circuit 76 by an appropriate potentiometer. When the magnitude of the integrator output $V_I$ falls below the fifth predetermined voltage $V_{REF5}$ during the first integration period, the comparator generates an output signal which is applied to full indicator 80 which provides a visual or audio indication of a full container condition. To properly calibrate this circuit, the transducer 10 is placed on a portion of the container 11 which is known to contain liquid and repetition rate generator 24 is again enabled. The magnitude of the fifth reference voltage $V_{REF5}$ applied to the second comparator of calibration circuit 76 is adjusted until full indicator 80 just illuminates at the end of the first integration period. In this manner, calibration circuit 76 calibrates the magnitude of the integrator output $V_I$ for both a full and empty container.

Empty/full detector 74 compares the magnitude of the integrator output $V_I$ to a reference value which defines the geometric mean between the empty and full integration voltages $V_I$ as determined by calibration circuit 76. To ensure that this comparison takes place only durin the first integration period, empty/full detector 74 makes the foregoing comparison only when it recieves both the charge enable and $T_B$ENABLE signal. Empty/full detector 74 generates an output signal $V_O$ which is indicative of whether the integrator circuit $V_I$ is above or below the geometric means voltage and is therefore indicative of whether the container 11 is full or empty. The output signal $V_O$ may be applied to any appropriate control and/or indicator device used in connection with the fluid system within container 11. It is preferable that the empty/full detector 74 include an adjustable time delay circuit which prevents a changeover in the output of the empty/full detector 74 for a sufficiently long period to prevent the generation of a false output signal due to liquid sloshing which often occurs in industrial situations. If the empty or full condition persists for a sufficiently long time, the time delay circuit will time out and an appropriate change in the output of detector 74 will be permitted.

To ensure proper operation of detection circuit 22, the amplitude of the first reflection 36' of the amplified reflection signal $V_A$ must reach the predetermined reference value $V_{REF1}$. If a fault occurs within the system, or if a sufficiently poor coupling between transducer 10 and container 11 is made, amplifier 30 will not be able to amplify the reflection signal $V_R$ to the appropriate level. In such a condition, the gain signal $V_G$ will decrease to an extremely low value in attempt to increase the gain of amplifier 30. Such a condition indicates a fault within fluid detection circuit 22 and is used both to prevent the generation of a false output signal $V_O$ and to enable an appropriate alarm. To this end, the gain signal $V_G$ is applied to a fault detector 82 which compares the magnitude of the gain signal $V_G$ to a predetermined value indicative of a fault condition. When the magnitude of the gain signal $V_G$ falls below this value, fault detector 82 generates a fault alarm signal FLTALRM which is applied to both fault arm 84 and empty/full detector 78. Fault alarm signal FLTALRM causes fault alarm 84 to generate appropriate visual and/or audible alarm which informs the user of detection circuit 22 that the circuit is operating improperly and must be readjusted. The fault alarm signal FLTALRM also disables empty/full detector 74 so as to ensure that improper output signals $V_O$ will not be generated. The fault alarm signal FLTALRM may also be utilized to automatically terminate or initiate any appropriate responsive activity to ensure that the fluid system being monitored is not damaged or otherwise degraded.

In the foregoing description, detector circuit 22 has been described as determining the presence or absence of liquid within the container 11. Since the attenuation rate of the reflection signals 34 varies for different fluid densities and different types of fluids, detection circuit 22 may be utilized to determine certain parameters (e.g. density and type of a fluid) within the container 11. In such a case, empty/full detector 74 would compare the integrator output $V_I$ to a value indicative of a particular fluid parameter being monitored by circuit 22. Additionally, detector circuit 74 may be replaced by other circuitry which will evaluate any desired fluid parameters as a function of the value of integrator output $V_I$.

The integration technique of fluid detection circuit 22 overcomes many problems which result from the difficulty of mounting transducer 10 to the wall of container 11 in such a manner that its axis is perfectly perpendicular to a tangent of the vessel wall at the point of contact. It is always desirable, however, to maintain this perpendicularity as truly as possible and to ensure a firm contact between transducer 10 and the wall of container 11. Two suitable transducer mounting assemblies 88, 126 are illustrated in FIGS. 9 through 14.

Transducer mounting assembly 88 is schematically illustrated in FIGS. 9–11. As shown in FIG. 9, a transducer assembly 88 is housed in a transducer housing 90 which is connected to a spring plate 92 by appropriate fastening bolts 94, 96. The spring plate 92 is rigidly coupled to a thick base plate 98 by associated bolts 100, 102 and spring biases housing 90 in the direction of the wall of container 11 when transducer 10 (which extends through an opening in housing 90, spring plate 92 and base plate 98) is biased into contact with container 11. Transducer 10 is biased into contact with the wall of container 11 by a steel or other appropriate rope 104 which extends around container 11 and is securely fastened to base plate 98 in the manner illustrated in FIGS. 10 and 11.

As shown in FIG. 10, one end of rope 106 is threaded through openings 106, 108 in base plate 98 and securely fastened to base plate 98 by a screw 110 extending through an internally threaded opening in base plate 98. While it is preferred to pass rope 104 through both holes 106, 108, as shown, adequate results may be obtained if rope 104 is threaded through hole 108 only and secured to base plate 98 by screw 110. It is preferred that a piece of sheet metal 109 be interposed between the screw 110 and the rope 104. The sheet metal 109 may, however, be omitted.

The free end of rope 104 is extended around container 108 and is threaded through a third opening 112 in base plate 98. See FIG. 11. The free end of rope 104 is welded or otherwise connected to a traveling nut 114 which is coupled to the shaft of hoist screw 116. Hoist 116 is rotatably coupled to base plate 98 and causes traveling nut 114 to move towards or away from base plate 98 as a function of the direction of rotation of hoist screw 116. By rotating hoist screw 116 in a direction which will cause traveling nut 114 to move away from base plate 112, the tension of the steel rope 104 may be appropriately adjusted so as to firmly bias transducer 10 against the wall of container 11.

In order to obtain optimal results, it is desirable to ensure that transducer 10 is biased against the wall of container 11 with a predetermined force and to ensure that the axis of transducer 10 is perpendicular to a tangent to the wall of container 11 at the point of contact between transducer 10 and container 11. The former result is obtained as a result of the use of spring plate 92. Particularly, spring plate 92 will counteract the force on transducer 10 (which force results from the tightening of rope 104) by an amount which will maintain the force between transducer 10 and the wall of container 11 substantially at a predetermined value. The perpendicularity between the axis of transducer 10 and the tangent to the wall of container 11 is ensured by L-shaped channels 118, 120 which depend from base plate 98 and are coupled thereto by appropriate bolts 122, 124, respectively.

A second mounting structure 126 is illustrated schematically in FIGS. 12 through 14. As shown therein, a transducer assembly 128 is coupled to transducer housing 130 via a spring support plate 132 and bolts 134, 136. The transducer assembly 128, and therefore transducer 10, are biased towards the wall of container 11 by a compression spring 138. Transducer housing 130 is coupled to base plate 140 via appropriate bolts 142, 144 in such a manner that transducer 10 extends through base plate 140 towards the wall of container 11.

Base plate 140 is coupled to the wall of container 11 by a steel cable assembly 148 which is best illustrated in FIGS. 13 and 14. The primary components of cable assembly 148 are flexible cables 150, 152, 154 and jam-fitting fasteners 156, 158, 160. A loop is formed at either end of first flexible cable 150 by loop sleeves 162, 164, respectively. Each loop is looped around a respective shoulder screw 166, 168 which is tightened to securely fasten flexible cable 152 to base plate 140. Flexible cable 150 is threaded through openings 170, 172 in either end of jam-fitting fastener 156 to ensure that the looped ends of flexible cable 150 do not rotate about the shoulder screws 166, 168. The position of jam-fitting fastener 156 with respect to shoulder screws 166, 168 is maintained by screws 174, 176 which extend through internally threaded openings on either end of fastener 156 and are rotated into pressure contact with flexible cable 150. Flexible cable 154 is connected to base plate 140 in a similar manner.

Flexible cables 150, 154 are connected to each other by flexible cable 152 and jam-fitting fastener 158. As best seen in FIG. 14, flexible cable 152 is looped through the V-shaped loops formed by flexible cables 150, 154 and are threaded through respective openings 178, 180 in fastener 160. In order to securely fasten base plate 140 (and therefore transducer 10) to the wall of pipe 11, the screw 182 of fastener 160 is placed in pressure contact with the portion of flexible cable 152 extending through opening 180 and the remaining end of cable 152 which extends through opening 178 is tightly pulled through opening 178 until the desired pressure contact is obtained. At this point, screw 184 of fastener 160 is tightened to maintain the desired pressure contact between base plate 140 and the wall of container 11. As with the embodiment illustrated in FIGS. 9–12, perpendicularity between the axis of the transducer 10 and the tangent to the wall of container 11 is ensured by a pair of L-shaped channels 186, 188. These channels are coupled to base plate 140 by appropriate bolts 190, 192. Additionally, compression spring 138 acts against the force applied to transducer 10 by the wall of container 11 to a degree which will ensure that the contact force between transducer 10 and the wall of container 11 is maintained substantially at a predetermined desired value.

As used in the following claims, the term fluid condition shall encompass any fluid parameter (or parameters) being monitored by detection circuit 22 including, but not restricted to, the presence or absence of fluid in the container 11 or the type or density of the fluid in the container.

The present invention may be embodied in other specific forms without departing from the spirit or essential attributes thereof and, accordingly, reference should be made to the appended claims, rather than to the foregoing specification as indicating the scope of the invention.

What is claimed is:

1. Apparatus for determining a fluid condition adjacent an inner wall boundary of a fluid container of the type which includes a wall having said inner and an outer wall boundary, said apparatus comprising:
   (A) transducer means, including a sonic transducer, for:
      (1) applying a sonic pulse to said outer wall boundary after said sonic transducer is placed in contact with said outer wall boundary such that said sonic pulse enters said wall and is reflected between said inner and outer wall boundaries, the magnitude of said sonic pulse decreasing each time it is reflected off of said inner wall boundary by an amount which varies as a function of said fluid condition adjacent said inner wall boundary;
      (2) generating an electrical reflection pulse whose magnitude is representive of the instantaneous magnitude of said sonic pulse each time said sonic pulse is reflected off of said outer wall boundary whereby said transducer means generates a train of electrical reflection pulses responsive to each sonic pulse applied to said outer wall boundary;
- (B) integration means for integrating said train of electrical reflection pulses during an integration period and for generating an integration output signal whose value varies as a function of said fluid condition; and
- (C) output means for comparing said integration output signal to a predetermined value to determine said fluid condition.

2. Apparatus according to claim 1, wherein said integration means comprises:
- (A) amplifier means for amplifying said train of electrical reflection pulses;
- (B) integrator means for integrating said amplified train of electrical reflection pulses during said integration period to thereby generate said integration output signal;
- (C) amplification control means for increasing the amplification of said amplifier means during said integration period.

3. Apparatus according to claim 2, wherein said amplification control means increases said amplification of said amplifier means as a function of the instantaneous value of said integration output signal.

4. Apparatus according to claim 3, wherein said amplification control means further adjusts the amplification of said amplifier means such that the magnitude of a first electrical reflection pulse in said train of electrical reflection pulses is substantially equal to a predetermined value and wherein said integration means includes means for preventing said integrator means from integrating said first electrical reflection pulse.

5. Apparatus according to claim 4, wherein said transducer means applies one said sonic pulse to said outer wall boundary during each of a plurality of successive transmission periods, each of said sonic pulses being reflected between said inner and outer wall boundary a sufficient number of times during its respective transmission period that the magnitude of said sonic pulse is reduced to zero before the termination of its respective transmission period.

6. Apparatus according to claim 5, wherein said amplification control means comprises:
- (A) $t_B$ signal generating means for generating a $t_B$ signal during each said transmission period in which said first reflection pulse is greater than a predetermined value; and
- (B) means responsive to said $t_B$ signal for adjusting the amplification of said amplifier means in such a manner that:
  - (1) the amplification of said amplifier means is greater at the end of any said transmission period during which said $t_B$ signal is not generated than at the beginning thereof; and
  - (2) the amplification of said amplifier means is less at the end of any transmission period during which said $t_B$ signal is generated than at the beginning thereof.

7. Apparatus according to claim 1, wherein said integration means includes an integrating capacitor and a transistor biased to operate as a current source, said transistor being coupled to said capacitor and to said transducer means in such a manner that said transistor causes the charge across said capacitor to change by an amount determined by the magnitude of said electrical reflection pulses during said integration period.

8. Apparatus according to claim 6, wherein said integration means further comprises means for maintaining the operating point of said transistor substantially constant irrespective of changes in temperature.

9. Apparatus according to claims 2, 3 or 4, wherein said integrator means includes an integrating capacitor and a transistor biased to operate as a current source said transistor being coupled to said capacitor and to said transducer means in such a manner that said transistor causes the charge across said capacitor to change by an amount determined by the magnitude of said electrical reflection pulses during said integration period.

10. Apparatus according to claim 9, wherein said integrator means further includes means for maintaining the operating point of said transistor substantially constant irrespective of changes in temperature.

11. A method for determining the presence or absence of a liquid in a fluid container, comprising the steps of:
- (A) applying a sonic pulse to a wall of said fluid container;
- (B) detecting a train of sonic reflection pulses induced in said container wall by said sonic pulse, the magnitude of each succeeding sonic reflection pulse in said train of pulses varying as a function of the presence or absence of liquid in said container;
- (C) integrating said sonic reflection pulses during an integration period so as to generate an integration output signal whose magnitude is representative of the sum of the magnitude of said reflection pulses; and
- (D) comparing said integration output signal to a predetermined value to determine whether or not liquid is present in said container.

12. A method according to claim 11, wherein said step of integrating said sonic reflection pulses comprises the steps of:
- (A) amplifying said train of pulses by an amplification constant which increases during said integration period; and
- (B) integrating said amplified train of pulses during said integration period to thereby generate said integration output signal.

13. A method according to claim 12, wherein said amplification constant varies as a function of the instantaneous value of said integration output signal.

14. A method according to claims 12 or 13, further including the step of adjusting said amplification constant in such a manner that the magnitude of a first sonic reflection pulse in said train of pulses in substantially equal to a first predetermined value and wherein said first sonic reflection pulse is not integrated during step of integrating said sonic reflection pulses.

15. The method of claims 11 or 12, further including the step of generating a fault alarm signal whenever the magnitude of all of said sonic reflection pulses is below a second predetermined value.

16. A method according to claim 15, wherein said fault alarm signal is generated when the magnitude of said amplification constant rises above a third predetermined value corresponding to said second predetermined value.

17. A method according to claim 11, wherein said step of integrating said sonic reflection pulses is performed, in part, by an integrating capacitor and a transistor which is biased to operate as an amplifying transistor and which causes the charge across said capacitor to change by an amount determined by the magnitude of said sonic reflection pulses and wherein said method further includes the step of maintaining the operating point of said transistor substantially constant irrespective of changes in temperature.

18. A clamping device for coupling a sonic transducer to a generally circular container wall, comprising:
- a base plate having first and second sides;
- a transducer housing coupled to said first side of said base plate and housing a sonic transducer having a generally planar contact surface, said transducer extending through both said housing and said base plate such that said planar contact surface extends past said second side of said base plate;
- clamping means coupled to said base plate for firmly attaching said base plate to said container wall with said planar contact surface contacting said container wall;
- means for aligning said base plate with respect to said container wall in such a manner that said planar contact surface lies in a plane which is parallel to a tangent of said container wall at a point at which said planar contact surface contacts said container wall; and
- means for spring biasing said contact surface into pressure contact with said container wall substantially at a predetermined force.

19. A clamping device according to claim 18, wherein said aligning means comprises a pair of L-shaped brackets, each of said brackets having a first leg coupled to said second side of said base plate and a second leg extending away from said second side of said base plate toward said container wall.

20. The clamping device of claims 18 or 19, wherein said clamping means comprises a cable having first and second ends, said first end being fixedly connected to said base plate, said second end being coupled to tension adjusting means for adjusting the tension of said cable when said cable is extended around said container wall.

21. The clamping device of claims 20, wherein said tension adjusting means comprises:
- a hoist screw rotatably coupled to said base plate; and
- a traveling nut coupled to said hoist screw, said second end of said cable being coupled to said hoist screw.

22. A clamping device according to claim 21, wherein said first end of said cable extends through a first hole in said base plate and is firmly coupled to said base plate by a set screw extending through an internally threaded hole in said base plate and into said first hole on pressure contact with said cable.

23. A clamping device according to claim 22, further including a piece of sheet metal located between said set screw and that portion of said cable extending through said first hole.

24. The clamping device of claim 18, wherein said spring biasing means comprises a spring plate coupled to said first side of said base plate and wherein the transducer housing is coupled to said base plate via said spring plate.

25. A clamping device according to claims 18 or 19, wherein said clamping means comprises:
- a first cable having first and second ends coupled to said base plate so as to form a first loop;
- a second cable having first and second ends coupled to said base plate so as to form a second loop;
- a third cable extending through said first and second loops; and
- means for maintaining the tension of said third cable, and therefore the tension of said first and second loops, at a desired value.

26. A clamping device according to claim 25, wherein said means for maintaining the tension of said third cable at a desired value comprises a cylindrical fastener having first and second through-holes formed therein, opposite ends of third cable extending through said first and second through-holes, respectively, and first and second set screws extending through first and second internally threaded openings into said first and second through-holes, respectively, in pressure contact with said cable.

27. A method for determining a fluid condition adjacent an inner wall boundary of a fluid container of the type which includes a wall having said inner and an outer wall boundary, said method comprising the steps of:
- applying a sonic pulse to said outer wall boundary such that said sonic pulse enters said wall and is reflected between said inner and outer wall boundaries, the magnitude of said sonic pulse decreasing each time it is reflected off of said inner wall boundary by an amount which varies as a function of said fluid condition adjacent said inner wall boundary;
- generating an electrical reflection pulse whose magnitude is representative of the instantaneous magnitude of said sonic pulse each time said sonic pulse is reflected off of said outer wall boundary so as to generate a train of electrical reflection pulses responsive to each sonic pulse applied to said outer wall boundary;
- integrating said train of electrical pulses during an integration period so as to generate an integration output signal whose value varies as a function of said fluid condition; and
- comparing said integration output signal to a predetermined value to determine said fluid condition.

28. A method according to claim 27, wherein said fluid condition is the presence or absence of a liquid adjacent said inner wall boundary.

29. A method according to claim 27, wherein said liquid condition is the density of a fluid adjacent said inner wall boundary.

30. A method according to claim 28, wherein said fluid condition is the type of fluid adjacent said inner wall boundary.

31. A method according to claim 28, wherein said step of integrating said train of electrical pulses includes the step of amplifying the train of electrical reflection pulses by an amplification constant before said train of electrical reflection pulses are integrated and wherein said amplification constant is increased during said integration period.

32. A method according to claim 31, wherein said amplification constant is increased as a function of the instantaneous value of said integration output signal.

33. A method according to claim 32, further including the step of adjusting said amplification constant such that the magnitude of a first electrical reflection pulse in said train of electrical reflection pulses is substantially equal to a predetermined value and wherein said first electrical reflection pulse is not integrated during said step of integrating said train of electrical reflection pulses.

* * * * *